June 27, 1933.  G. E. WEIDNER  1,915,342
LOW PRESSURE GAS VALVE OR THE LIKE
Filed Jan. 6, 1933
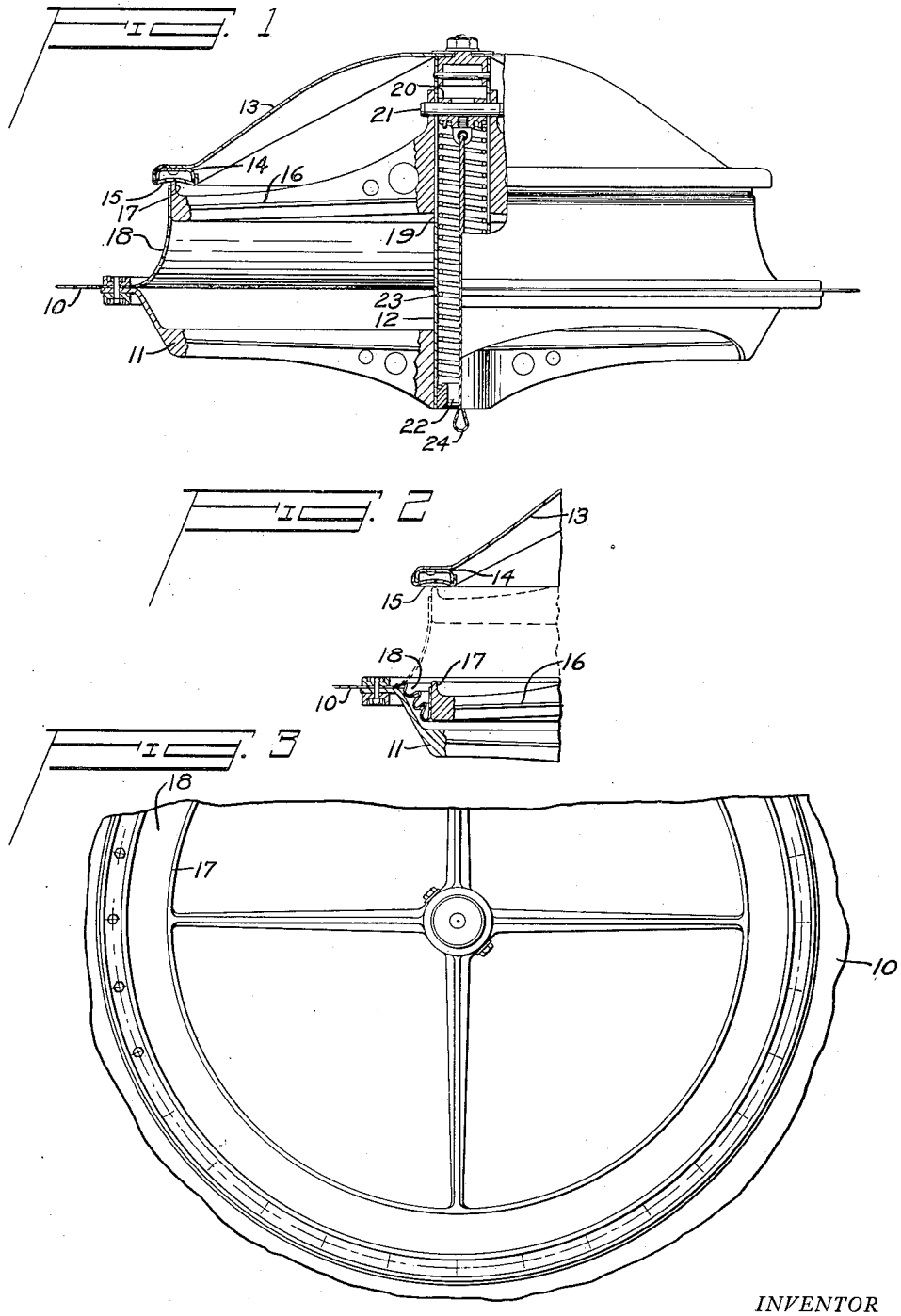
INVENTOR
GEORGE E. WEIDNER.
BY
ATTORNEYS Patented June 27, 1933

1,915,342

UNITED STATES PATENT OFFICE

GEORGE E. WEIDNER, OF DAYTON, OHIO

LOW PRESSURE GAS VALVE OR THE LIKE

Application filed January 6, 1933. Serial No. 650,521.

(GRANTED UNDER THE ACT OF MARCH 3, 1883, AS AMENDED APRIL 30, 1928; 370 O. G. 757)

The invention described herein may be manufactured and used by or for the Government for governmental purposes, without the payment to me of any royalty thereon.

This invention relates to valves and more particularly to fluid or gas valves adapted to be employed in connection with balloons or airships in which a lifting gas constitutes the buoyant power.

The principal object of my invention is to provide a manually operated fluid valve for balloons or the like that is not seriously affected during its manipulation by the difference in pressure between that of the outside atmosphere and that of the inside of the balloon gas bag.

A further object of this invention is to provide a low pressure gas valve that is positive in action and simple in construction.

A still further object of my invention is to provide a fluid valve for balloons or the like that is of light weight.

A still further object of my invention is to provide a low pressure valve that maintains a uniform seal between the closure elements regardless of the pressure or lack of pressure inside the balloon gas bag.

A still further object of this invention is to provide a gas valve for balloons or airships that is substantially protected from the elements, thereby making for long life.

A still further object of my invention is to provide a low pressure gas valve that is economical in manufacture and durable in use.

These and other objects will be apparent to those skilled in the art.

My invention consists in the construction, arrangement and combination of the various parts of the device, thereby the objects contemplated are attained, as hereinafter more fully set forth, pointed out in my claims and illustrated in the accompanying drawing, in which:—

Fig. 1 is a side sectional view of my complete device in use and in a closed position;

Fig. 2 is a side sectional view of a portion of my valve showing the same in an open condition; and Fig. 3 is a top plan view of the movable spidered ring of the device.

In the construction and arrangement of valves of this nature which have been heretofore manufactured, a dome or plate is moved to place the valve in an open position to permit the outlet or inlet of a fluid. These domes or plates not only interfere with the free flow of the fluid but are so affected by the difference in pressure between that of the outside atmosphere and that of the inside of the gas bag that manual operation of the valve is difficult. Furthermore, most of the working parts of these valves are exposed to the elements. I have overcome such objections as will be hereinafter understood.

Referring to the drawing, I have used the numeral 10 to designate the upper portion of a balloon gas bag in which is installed my low pressure valve. The numeral 11 designates the lower spidered ring fixedly secured at its outer edge by any suitable means to the marginal edge of the bag around the gas outlet opening in the apex of the bag. The numeral 12 designates a hollow vertical spindle rigidly secured at its lower end to the dead center of the spidered ring 11. The numeral 13 designates a rigid dome or plate member secured at its center to the top of the spindle 12.

The numeral 14 designates an inverted circular trough member secured to the under outer rim portion of the dome 13. The numeral 15 designates a resilient strip or the like of suitable material secured to and closing the trough 14 by extending between its lower edges, as shown in Fig. 1. The numeral 16 designates the upper movable spidered ring having its center portion slidably mounted on the spindle 12 and positioned between the dome 13 and spidered ring 11. The numeral 17 designates an upwardly extending circular flange or ridge on the upper surface of the ring 16. This circular flange is so designed and positioned to be capable of engaging the member 15 between the two downwardly extending walls of the trough 14. These members 15 and 17 may be considered as the valve seat and valve respectively of the device. The numeral 18 designates a flexible sleeve having its upper end portion tightly embracing and secured to the periphery of the ring 16, and its lower end tightly secured to the fixed lower ring 11, as shown in Fig. 1. The numeral 19 designates the two longitudinal slots in the upper portion of the hollow spindle 12, which are positioned diametrically opposite from each other. The numeral 20 designates a block member slidably mounted in the upper portion of the hollow spindle 12. The numeral 21 designates a pin extending through and slidably mounted in the slots 19. This pin is also secured to the central portion of the spidered ring 16 and the block member 20, as shown in Fig. 1.

The numeral 22 designates a hollow plug suitably secured into the lower end of the hollow spindle. The numeral 23 designates a coil spring inside the hollow spindle, having one end engaging the block member 20 and its other end engaging the hollow plug 22.

By this construction and arrangement of parts the coil spring will yieldingly hold the movable spidered ring 16 in an upward position and in so doing the circular flange valve member 17 will be yieldingly held in contact with the valve seat member 15. With the member 17 in contact with the member 15 the device will be sealed to prevent either inlet or outlet of fluid as far as the balloon gas bag is concerned. To open my low pressure valve it is necessary to lower the movable spidered ring 16 against the action of the spring 23. To manually accomplish this I provide a cable 24, which has its upper end secured to the block member 20. This cable passes through the hollow plug 22 and coil spring 23 and may from there lead to a point in close proximity to the operator.

Due to the small cross-sectional area of parts in the path of the gas flow, little effort will be required to operate the valve. Furthermore, the pressures inside the gas bag and outside the gas bag will have little tendency to cause either the opening or closing of the valve. Naturally such desirable results could not be obtained if a movable dome or plate were used.

My construction also provides a comparatively large valve opening relative to the movement of the operating cable 24. As the movable parts are little affected by gas pressure, the effective action of the spring will remain constant, thereby making possible uniform valve action. By releasing pull on the cable 24, the spring 23 will return the valve parts to a closed position. The amount of downward movement of the cable will be relative to the amount of opening of the valve.

From the foregoing it will readily be seen that I have provided a very desirable and efficient low pressure valve, and although I have described it as particularly adaptable to balloon or airship use, it may be used to equal advantage for other purposes.

Some changes may be made in my valve without departing from the real spirit and purpose of the invention, and it is my intention to cover by my claims all modified forms of construction or use of mechanical equivalents that may be reasonably included in their scope.

I claim:

1. A valve mechanism comprising, a spindle, a lower member secured to the lower end portion of said spindle, an upper member secured to the upper end portion of said spindle, a slidable member slidably mounted on said spindle and capable of engaging said member secured to the upper portion of said spindle, and a flexible sleeve having one end secured to the slidably mounted member, and its other end secured to said lower member.

2. A valve mechanism comprising, a spindle, a spidered ring member rigidly secured to the lower end portion of said spindle, a dome member rigidly secured to the upper end portion of said spindle, a spidered ring slidably mounted on said spindle and capable of engaging said dome member when slid in one direction, and a flexible sleeve having one end secured to said slidably mounted spidered ring and its other end secured to said spidered ring that is rigidly secured to the lower end portion of said spindle.

3. A valve mechanism comprising, a spindle, a spidered ring member rigidly secured to said spindle, a plate member rigidly secured to said spindle and spaced apart from said ring member, a spidered ring slidably mounted on said spindle and positioned between said first-mentioned spidered ring and said plate member, a flexible sleeve having one end secured to said slidably mounted ring and its other end secured to the said first-mentioned ring, and a contacting member on said slidably mounted member capable of operatively engaging said plate member when said slidably mounted spidered ring is moved toward said plate member.

4. A valve mechanism comprising, a spindle, a spidered ring member rigidly secured to said spindle, a plate member rigidly secured to said spindle and spaced apart from said ring member, a spidered ring slidably mounted on said spindle and positioned between said first-mentioned spidered ring and said plate member, a flexible sleeve having one end secured to said slidably mounted ring and its other end secured to the said first-mentioned ring, and a circular flange on said slidably mounted ring capable of operatively engaging said plate member when said slidably mounted ring is moved toward said plate member.

5. A valve mechanism comprising, a spindle, a spidered ring member rigidly secured to said spindle, a plate member rigidly secured to said spindle and spaced apart from said ring member, a spidered ring slidably mounted on said spindle and positioned between said first-mentioned spidered ring and said plate member, a flexible sleeve having one end secured to said slidably mounted ring and its other end secured to the said first-mentioned ring, a valve seat on said plate member, and a valve seat engaging member on said slidably mounted ring.

6. A valve mechanism comprising, a spindle, a spidered ring member rigidly secured to said spindle, a plate member rigidly secured to said spindle and spaced apart from said ring member, a spidered ring slidably mounted on said spindle and positioned between said first-mentioned spidered ring and said plate member, a flexible sleeve having one end secured to said slidably mounted ring and secured to the said first-mentioned ring, a circular valve seat on said plate member and a circular valve seat engaging member on said slidably mounted ring capable of seating with said circular valve seat at times.

7. A valve mechanism comprising, a spindle, a pervious member rigidly secured to said spindle, an impervious member rigidly secured to said spindle and spaced apart from said pervious member, a pervious member slidably mounted on said spindle, and positioned between said first-mentioned pervious member and said impervious member, and capable of engaging said impervious member when moved in one direction, and a flexible sleeve member secured at one end to said pervious member slidably mounted on said spindle and its other end secured to said pervious member that is rigidly secured to said spindle.

8. A valve mechanism comprising, a spindle, a pervious member rigidly secured to said spindle, an impervious member rigidly secured to said spindle and spaced apart from said pervious member, a pervious member slidably mounted on said spindle, and positioned between said first-mentioned pervious member and said impervious member, a resilient valve seat on said impervious member, and a valve seat engaging member on said slidably mounted pervious member capable of engaging said resilient valve seat when said pervious member is slid in one direction.

9. A valve mechanism comprising, a spindle, a pervious member rigidly secured to said spindle, an impervious member rigidly secured to said spindle and spaced apart from said pervious member, a pervious member slidably mounted on said spindle and positioned between said first-mentioned pervious member and said impervious member, a circular endless inverted trough member on said impervious member, a strip member stretched between and secured to the two downwardy extending side walls of said trough, and a circular endless flange on said slidably mounted pervious member capable of engaging said stretched strip member when said pervious member is slid in one direction.

10. A valve mechanism comprising, a spindle, a pervious member rigidly secured to said spindle, an impervious member rigidly secured to said spindle and spaced apart from said pervious member, a pervious member slidably mounted on said spindle and positioned between said first-mentioned pervious member and said impervious member and capable of engaging said impervious member when moved in one direction, a flexible sleeve member secured at one end to said pervious member slidably mounted on said spindle and its other end secured to said pervious member that is rigidly secured to said spindle, and a means for yieldingly holding said slidably mounted pervious member in engagement with said impervious member.

11. A valve mechanism comprising, a a spindle, a pervious member rigidly secured to said spindle, an impervious member rigidly secured to said spindle and spaced apart from said pervious member, a pervious member slidably mounted on said spindle and positioned between said first-mentioned pervious member and said impervious member and capable of engaging said impervious member when moved in one direction, a flexible sleeve member secured at one end to said pervious member slidably mounted on said spindle and its other end secured to said pervious member that is rigidly secured to said spindle, and a coil spring for yieldingly holding said slidably mounted pervious member in engagement with said impervious member.

12. A valve mechanism comprising, a spindle, a pervious member rigidly secured to said spindle, an impervious member rigidly secured to said spindle and spaced apart from said pervious member, a pervious member slidably mounted on said spindle and positioned between said first-mentioned pervious member and said impervious member and capable of engaging said impervious member when moved in one direction, a flexible sleeve member secured at one end to said pervious member slidably mounted on said spindle and its other end secured to said pervious member that is rigidly secured to said spindle, a means for yieldingly holding said pervious member in engagement with said impervious member, and a manually operated means for sliding said pervious member out of engagement with said impervious member at times.

13. A valve mechanism comprising, a hollow spindle, a spidered ring rigidly secured to said spindle, a plate member rigidly secured to said spindle and spaced from said ring, a spidered ring slidably mounted on said spindle and capable of having its circular outer portion seating with said plate when slid in the direction of that member, a flexible sleeve embracing the periphery of and secured to said slidably mounted ring, and its other end secured to said first-mentioned ring, and a coil spring inside said hollow spindle having one of its ends operatively engaging said spindle and its other end operatively engaging said slidably mounted ring.

14. A valve mechanism comprising, a hollow spindle, a spidered ring rigidly secured to said spindle, a plate member rigidly secured to said spindle and spaced from said ring, a spidered ring slidably mounted on said spindle and capable of having its circular outer portion seating with said plate when slid in the direction of that member, a flexible sleeve embracing the periphery of and secured to said slidably mounted ring, and its other end secured to said first-mentioned ring, a coil spring inside said hollow spindle having its lower end operatively engaging said hollow spindle, a pair of oppositely arranged longitudinal slots in the upper portion of said spindle, and a key member slidably engaging said slots rigidly secured to said slidably mounted ring and operatively engaging the top of said spring.

15. A valve mechanism comprising, a hollow spindle, a spidered ring rigidly secured to said spindle, a plate member rigidly secured to said spindle and spaced from said ring, a spidered ring slidably mounted on said spindle and capable of having its circular outer portion seating with said plate when slid in the direction of that member, a flexible sleeve embracing the periphery of and secured to said slidably mounted ring, and its other end secured to said first-mentioned ring, a coil spring inside said hollow spindle having its lower end operatively engaging said hollow spindle, a pair of oppositely arranged longitudinal slots in the upper portion of said spindle, a key member slidably engaging said slots rigidly secured to said slidably mounted ring and operatively engaging the top of said spring, and an operating cable having its upper end operatively secured to said key and extending downwardly through said spring and said hollow spindle.

In testimony whereof I affix my signature.

GEORGE E. WEIDNER.